(12) United States Patent
Aota et al.

(10) Patent No.: US 8,013,700 B2
(45) Date of Patent: Sep. 6, 2011

(54) FIELD ELEMENT

(75) Inventors: Keiji Aota, Shiga (JP); Yoshinari Asano, Shiga (JP)

(73) Assignee: Daikin Industries, Ltd., Osaka (JP)

( * ) Notice: Subject to any disclaimer, the term of this patent is extended or adjusted under 35 U.S.C. 154(b) by 142 days.

(21) Appl. No.: 12/595,172

(22) PCT Filed: Apr. 8, 2008

(86) PCT No.: PCT/JP2008/056943
§ 371 (c)(1),
(2), (4) Date: Oct. 8, 2009

(87) PCT Pub. No.: WO2008/132996
PCT Pub. Date: Nov. 6, 2008

(65) Prior Publication Data
US 2010/0164664 A1  Jul. 1, 2010

(30) Foreign Application Priority Data

Apr. 18, 2007 (JP) ................. 2007-109351

(51) Int. Cl.
*H01F 1/00* (2006.01)
*H02K 1/22* (2006.01)
(52) U.S. Cl. .............. 335/296; 335/297; 310/156.57; 310/268
(58) Field of Classification Search .......... 335/296, 335/297; 310/156.25, 156.57, 156.82, 261.1, 310/268
See application file for complete search history.

(56) References Cited

U.S. PATENT DOCUMENTS

| 6,008,559 | A | 12/1999 | Asano et al. |
|---|---|---|---|
| 6,218,753 | B1 | 4/2001 | Asano et al. |
| 7,777,391 | B2 * | 8/2010 | Asano .......................... 310/268 |
| 2005/0179337 | A1 | 8/2005 | Hasebe et al. |
| 2007/0018520 | A1 | 1/2007 | Kaneko et al. |
| 2009/0015110 | A1 | 1/2009 | Asano |

FOREIGN PATENT DOCUMENTS

| EP | 1 942 572 A1 | 7/2008 |
|---|---|---|
| JP | 2-30275 U | 2/1990 |
| JP | 8-251846 A | 9/1996 |

(Continued)

*Primary Examiner* — Ramon M Barrera
(74) *Attorney, Agent, or Firm* — Birch, Stewart, Kolasch & Birch, LLP (57) ABSTRACT

The present invention relates to a field element which reduces a harmonic component of a magnetic flux density. Permanent magnets (20) are in contact with first magnetic plates (1, 3) in a direction parallel to a rotation axis (P). The first magnetic plate (1) includes first and second magnetic members (10, 12) and first and second non-magnetic members (11, 13). The first magnetic member (10) includes a pole center and is in contact with one of the permanent magnets. The first magnetic member (10), the first non-magnetic member (11), the second magnetic member (12) and the second non-magnetic member (13) are disposed in the stated order in a circumferential direction with the pole center and the rotation axis being as a starting point and a center, respectively. When Pn represents the number of pole pairs and i represents an odd number equal to or more than three, an angle $\theta1$ defined by an end portion (131) of the second non-magnetic member (13) on the pole center side with respect to a pole gap is $0<\theta1<180/(i \cdot Pn)$. An angle $\theta2$ defined by an end portion (111) of the first non-magnetic member (11) on the pole center side with respect to the pole gap is $180/(i \cdot Pn) \leq \theta2 \leq 180 \cdot 2/(i \cdot Pn)$.

20 Claims, 8 Drawing Sheets

FOREIGN PATENT DOCUMENTS

| | | |
|---|---|---|
| JP | 10-201147 A | 7/1998 |
| JP | 11-98731 A | 4/1999 |
| JP | 2000-69695 A | 3/2000 |
| JP | 2002-44888 A | 2/2002 |
| JP | 2002-78260 A | 3/2002 |
| JP | 2005-143276 A | 6/2005 |
| JP | 2006-230184 A | 8/2006 |
| JP | 2007-28868 A | 2/2007 |
| JP | 2007-89270 A | 4/2007 |
| JP | 2007-97387 A | 4/2007 |

* cited by examiner

FIELD ELEMENT

TECHNICAL FIELD

The present invention relates to a field element, and for example, to an axial gap type field element.

BACKGROUND ART

Patent Document 1 discloses a radial type rotor in which a plurality of permanent magnets are embedded in a circumferential direction with a rotation axis being as a center. In the rotor, air gaps are provided at both ends of the permanent magnets in the circumferential direction. An angle defined by an end portion of the air gap on a side closer to a pole center with respect to the rotation axis varies for each pole, whereby cogging torque is reduced.

Technologies related to the present invention are disclosed in Patent Documents 2 to 4.

Patent Document 1: Japanese Patent Application Laid-Open No. 11-98731
Patent Document 2: Japanese Patent Application Laid-Open No. 10-201147
Patent Document 3: Japanese Patent Application Laid-Open No. 2000-69695
Patent Document 4: Japanese Patent Application Laid-Open No. 2002-44888

DISCLOSURE OF INVENTION

Problem to be Solved by the Invention

However, in the technology described in Patent Document 1, in the rotor, the shapes for each pole is not the same, and accordingly an imbalance is created in torque, which is a cause in inducing vibrations.

Meanwhile, it is desired to reduce vibrations and noise also in an axial type rotating electric machine.

An object of the present invention is therefore to provide a field element capable of reducing vibrations and noise.

Means to Solve the Problem

According to a first aspect of the present invention, a field element includes: a plurality of permanent magnets (20) circularly disposed about a predetermined axis (P); a first magnetic member (10) being in contact with a magnetic pole surface of one of the permanent magnets in a first direction parallel to the axis; a first non-magnetic member (11) which is adjacent to the first magnetic member (10) in a second direction being a circumferential direction with the axis being as a center and overlaps a part of the permanent magnet (20) in the first direction; a second magnetic member (12) being adjacent to the first non-magnetic member (11) on a side opposite to the first magnetic member (10) in the second direction; and a second non-magnetic member (13) being adjacent to the second magnetic member (12) on a side opposite to the first non-magnetic member (11) in the second direction, in which when Pn represents the number of pairs of magnetic poles provided by the permanent magnets about the axis (P) and i represents an integer equal to or more than three, a first angle $\theta 1$ defined by a boundary (131) between the second magnetic member (12) and the second non-magnetic member (13) in the second direction with respect to a reference axis (Q) which passes through a midpoint between the permanent magnets being adjacent to the one of the permanent magnets on the second non-magnetic member (13) side and the one of the permanent magnets and which is parallel to a radial direction with the axis (P) being as the center, and a second angle $\theta 2$ defined by a boundary (111) between the first magnetic member (10) and the first non-magnetic member (11) in the second direction with respect to the reference axis (Q) with the axis (P) being as the center satisfy: $0<\theta 1<180/(i\cdot Pn)$; and $(i\cdot Pn)=\theta 2=180\cdot 2/(i\cdot Pn)$.

According to a second aspect of the field element of the present invention, in the field element according to the first aspect, a part of the first magnetic member (10) is arranged between the permanent magnet (20) and the first non-magnetic member (11).

According to a third aspect of the present invention, in the field element according to the first or second aspect, the field element further includes third magnetic members (14, 34) which are positioned between the one of the permanent magnets and the permanent magnets being adjacent to the one of the permanent magnets and extend in the first direction.

According to a fourth aspect of the present invention, in the field element according to any one of the first to third aspects, the field element further includes a fourth magnetic member (15) coupling the first magnetic member (10) and the second magnetic member (12) on at least one end side of the first non-magnetic member (11) which is opposite to the axis (P) in a third direction being a radial direction with the axis (P) being as the center.

According to a fifth aspect of the field element of the present invention, in the field element according to the fourth aspect, the fourth magnetic member (15) extends in the second direction beyond the second non-magnetic member (13) in the third direction.

According to a sixth aspect of the field element of the present invention, in the field element according to any one of the first to fifth aspects, the first angle $\theta 1$ satisfies $\theta 1=90/(i\cdot Pn)$, and the second angle $\theta 2$ satisfies $\theta 2=180/(i\cdot Pn)$.

According to a seventh aspect of the field element of the present invention, in the field element according to any of the first to sixth aspects, i is 5 or 7.

According to an eighth aspect of the field element of the present invention, in the field element according to any one of the first to seventh aspects, the first non-magnetic member (11) includes: a first non-magnetic member part (11a); and a second non-magnetic member part (11b) which is adjacent to the first non-magnetic member part (11a) on the first magnetic member (10) side in the second direction and has a length in a direction being parallel to the first direction or the third direction, the length being different from that of the first non-magnetic member part (11a); the second non-magnetic member (13) includes: the third non-magnetic member part (13a); and a fourth non-magnetic member part (13b) which is adjacent to the third non-magnetic member part (13a) on the first magnetic member (10) side in the second direction and has a length in a direction being parallel to the first direction or the third direction, the length being different from that of the first non-magnetic member part (13a); and when j represents an integer equal to or more than three and j is a value different from i, a third angle $\theta 3$ defined by a boundary (13lb) between the third non-magnetic member part (13a) and the fourth non-magnetic member part (13b) in the second direction with respect to the reference axis (Q) with the axis (P) being as the center and a fourth angle $\theta 4$ defined by a boundary (111b) between the first non-magnetic member part (11a) and the second non-magnetic member part (1lb) in the second direction with respect to the reference axis (Q) with the axis (P) being as the center satisfy: $0<\theta 3<180/(j\cdot Pn)$; $180/(j\cdot Pn)=\theta 4=180\cdot 2/(j\cdot Pn)$; and $\theta 3<\theta 1<\theta 4<\theta 2$.

According to a ninth aspect of the field element of the present invention, in the field element according to the eighth aspect, the third angle θ3 satisfies θ3=90/(j·Pn), and the fourth angle θ4 satisfies θ4=180/(j·Pn).

According to a tenth aspect of the field element of the present invention, in the field element according to the eighth or ninth aspect, j is 5 or 7.

According to an eleventh aspect of the present invention, in the field element according to any one of the first to tenth aspects, the field element further includes: a fifth magnetic member (30) being adjacent to the permanent magnet (20) on a side opposite to the first magnetic member (10) in the first direction; a third non-magnetic member (31) which is adjacent to the fifth magnetic member (30) in the second direction and overlaps a part of the permanent magnet (20) in the first direction; a sixth magnetic member (32) being adjacent to the third non-magnetic member (31) on a side opposite to the fifth magnetic member (30) in the second direction; and a fourth non-magnetic member (33) being adjacent to the sixth magnetic member (32) on a side opposite to the third non-magnetic member (31) in the second direction, wherein when K represents an integer equal to or more than three, a fifth angle θ1 defined by a boundary (331) between the sixth magnetic member (32) and the fourth non-magnetic member (33) in the second direction with respect to the reference axis (Q) with the axis (P) being as the center and a sixth angle θ2 defined by a boundary (311) between the fifth magnetic member (30) and the third non-magnetic member (31) in the second direction with respect to the reference axis (Q) with the axis (P) being as the center satisfy: 0<θ1<180/(K·Pn); and (K·Pn)=θ2=180·2/(K·Pn).

According to a twelfth aspect of the field element of the present invention, in the field element according to the eleventh aspect, a part of the fifth magnetic member (30) is arranged between the permanent magnet (20) and the third non-magnetic member (31).

According to a thirteenth aspect of the present invention, in the field element according to the eleventh or twelfth aspect, the field element further includes a seventh magnetic member (35) coupling the fifth magnetic member (30) and the sixth magnetic member (32) on at least one end side of the third non-magnetic member (31) which is opposite to the axis (P) in the third direction.

According to a fourteenth aspect of the field element of the present invention, in the field element according to the thirteenth aspect, the seventh magnetic member (35) extends in the second direction beyond the fourth non-magnetic member (33) in the third direction.

According to a fifteenth aspect of the field element of the present invention, in the field element according to any one of the eleventh to fourteenth aspects, the fifth angle θ1 satisfies θ1=90/(K·Pn), and the sixth angle θ2 satisfies θ2=180/(K·Pn).

According to a sixteenth aspect of the field element of the present invention, in the field element according to any one of the eleventh to fifteenth aspects, K is 5 or 7.

According to a seventeenth aspect of the field element of the present invention, in the field element according to any one of the eleventh to sixteenth aspects, the third non-magnetic member (31) includes: a fifth non-magnetic member part (31a); and a sixth non-magnetic member part (31b) which is adjacent to the fifth non-magnetic member part (31a) on the fifth magnetic member (30) side in the second direction and has a length in a direction being parallel to the first direction or the third direction, the length being different from that of the fifth non-magnetic member part (31a); the fourth non-magnetic member (33) includes: a seventh non-magnetic member part (33a); and an eighth non-magnetic member part (33b) which is adjacent to the seventh non-magnetic member part (33a) on the fifth magnetic member (30) side in the second direction and has a length in a direction being parallel to the first direction or the third direction, the length being different from that of the seventh non-magnetic member part (33a); and when L represents an integer equal to or more than three and L is a value different from K, a seventh angle θ3 defined by a boundary (331b) between the seventh non-magnetic member part (33a) and the eighth non-magnetic member part (33b) in the second direction with respect to the reference axis (Q) with the axis (P) being as the center and an eighth angle θ4 defined by a boundary (311b) between the fifth non-magnetic member part (31a) and the sixth non-magnetic member part (31b) in the second direction with respect to the reference axis (Q) with the axis (P) being as the center satisfy: 0<θ3<180/(L·Pn); 180/(L·Pn)=θ4=180·2/(L·Pn); and θ3<θ1<θ4<θ2.

According to an eighteenth aspect of the field element of the present invention, the seventh angle θ3 satisfies θ3=90/(L·Pn), and the eighth angle θ4 satisfies θ4=180/(L·Pn).

According to a nineteenth aspect of the field element of the present invention, in the field element according to the seventeenth or eighteenth aspect, L is 5 or 7.

According to a twentieth aspect of the field element of the present invention, in the field element according to any one of the first to nineteenth aspects, the first magnetic member (10) and the second magnetic member (12) are formed of a dust core.

Effects of the Invention

According to the first aspect of the field element of the present invention, it is possible to cancel an i-order harmonic component of a density of a magnetic flux generated on a surface of the first magnetic member on the side opposite to the permanent magnet in the first direction, and thus the i-order harmonic component of the magnetic flux density can be reduced. As a result, in a case where an armature is disposed so as to oppose to the field element in the first direction to form a rotating electric machine, it is possible to reduce an i-order harmonic component of induced voltage generated in the armature, whereby it is possible to reduce vibrations and noise of the rotating electric machine.

According to the second aspect or the twelfth aspect of the field element of the present invention, a working point of the permanent magnet can be raised.

According to the third aspect of the field element of the present invention, a q-axis inductance can be increased, whereby it is possible to increase reluctance torque.

According to the fourth aspect or the thirteenth aspect of the field element of the present invention, it is possible to improve strength.

According to the fifth aspect or the fourteenth aspect of the field element of the present invention, it is possible to further improve the strength.

According to the sixth aspect of the field element of the present invention, the second angle θ2 is the smallest value, whereby the first magnetic member extends in the second direction. Accordingly, it is possible to improve the density of the magnetic flux generated on a surface at a center of the first magnetic member.

According to the seventh aspect, the tenth aspect, the sixteenth aspect or the nineteenth aspect of the field element of the present invention, an effect is particularly enhanced in a case where a fifth-order harmonic component and a seventh-order harmonic component are large.

According to the eighth aspect of the field element of the present invention, it is possible to further cancel a j-order harmonic component of the density of the magnetic flux generated on the surface of the first magnetic member on the side opposite to the permanent magnet in the first direction.

According to the ninth aspect of the field element of the present invention, it is possible to improve the density of the magnetic flux generated on the surface at the center of the first magnetic member in the second direction.

According to the eleventh aspect of the field element of the present invention, it is possible to cancel a K-order harmonic component of the density of the magnetic flux generated on a surface of the fifth magnetic member on the side opposite to the permanent magnet in the first direction, with the result that the K-order harmonic component of the magnetic flux density can be reduced. As a result, in a case where the armatures are disposed so as to oppose to each other on both sides of this field element in the first direction to form a rotating electric machine, it is possible to reduce the i-order harmonic component and the K-order harmonic component of induced voltage generated in the armatures, whereby it is possible to reduce vibrations and noise of the rotating electric machine.

According to the fifteenth aspect of the field element of the present invention, the sixth angle θ2 is the smallest value, and hence the fifth magnetic member extends in the second direction. Accordingly, it is possible to improve the density of the magnetic flux generated on the surface at the center of the fifth magnetic member.

According to the seventeenth aspect of the field element of the present invention, it is possible to further cancel an L-order harmonic component of the density of the magnetic flux generated on the surface of the fifth magnetic member on the side opposite to the permanent magnet in the first direction.

According to the eighteenth aspect of the field element of the present invention, it is possible to improve the density of the magnetic flux generated on the surface at the center of the fifth magnetic member in the second direction.

According to the twentieth aspect of the field element of the present invention, production is facilitated.

The object, features, aspects, and advantages of the present invention will be more apparent from the following detailed description in conjunction with the attached drawings.

BEST MODE FOR CARRYING OUT THE INVENTION

Hereinafter, embodiments according to the present invention will be described with reference to the attached drawings. Note that like reference numerals are used to designate like or identical members, and overlapping description will be omitted.

First Embodiment

Figure 1:
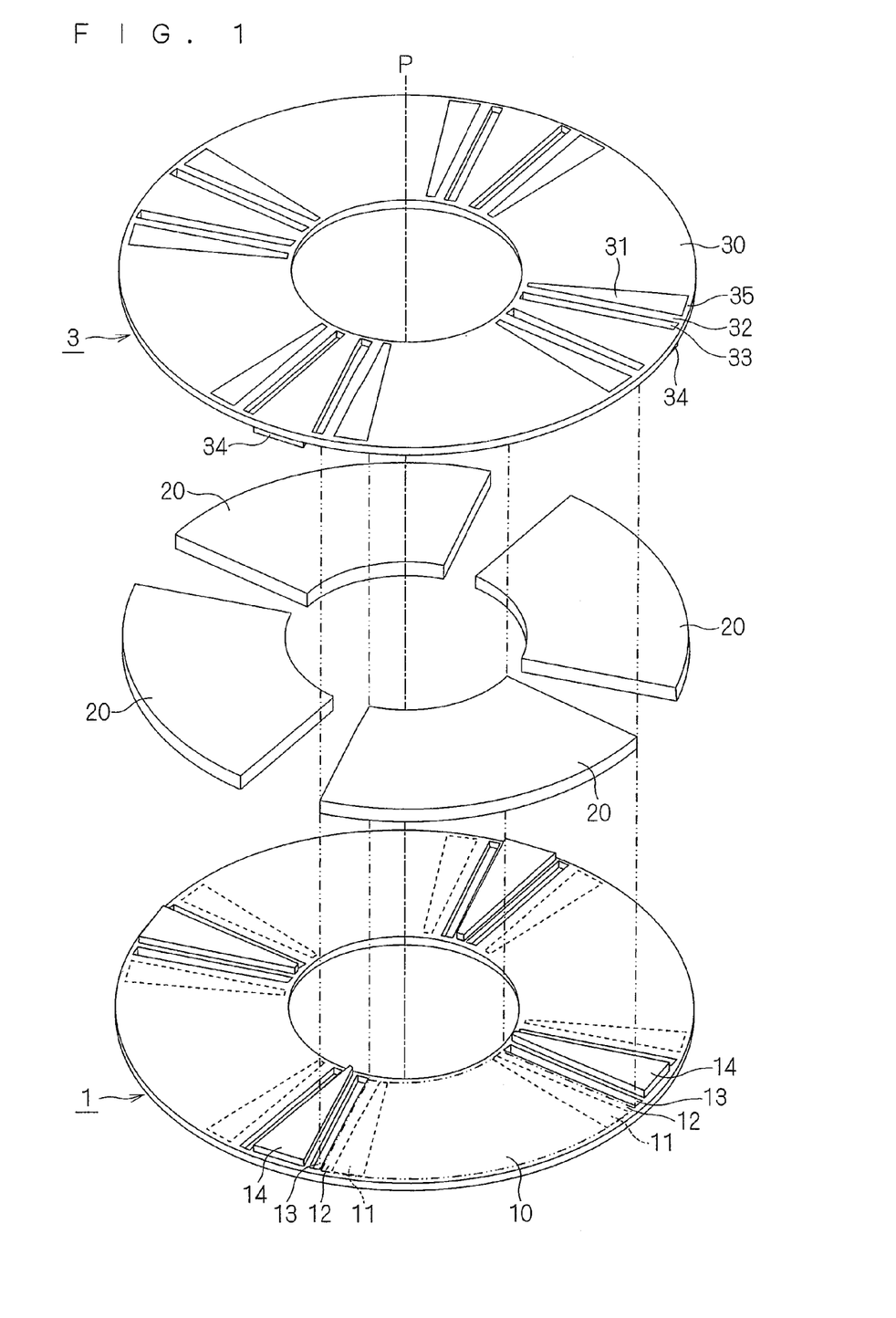
FIG. 1 is a conceptual perspective view of a field element according to a first embodiment, which is separated along a rotation axis.

A field element according to a first embodiment of the present invention will be described. FIG. 1 is a schematic perspective view in which this field element is disassembled along a rotation axis P. The field element shown in FIG. 1 is a so-called axial gap type field element.

The field element includes permanent magnets 20 and magnetic plates 1 and 3.

The permanent magnets 20 are magnetized in a direction parallel to the rotation axis P (hereinafter, referred to as rotation axis direction). The permanent magnets 20 are circularly disposed so that magnetization directions thereof alternately vary about the rotation axis P. FIG. 1 illustrates a so-called field element which has four poles in which four permanent magnets 20 are disposed.

Figure 2:
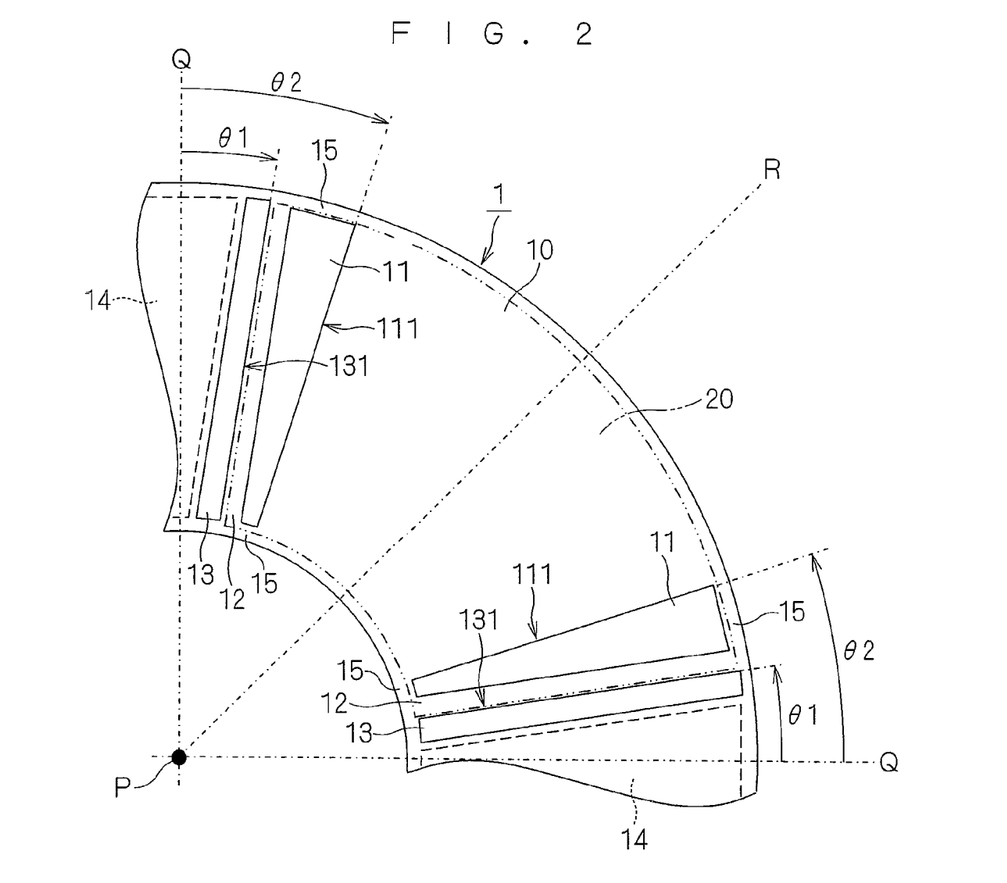
FIG. 2 is a bottom view showing a portion of the field element according to the first embodiment, which corresponds to one permanent magnet.
Figure 3:
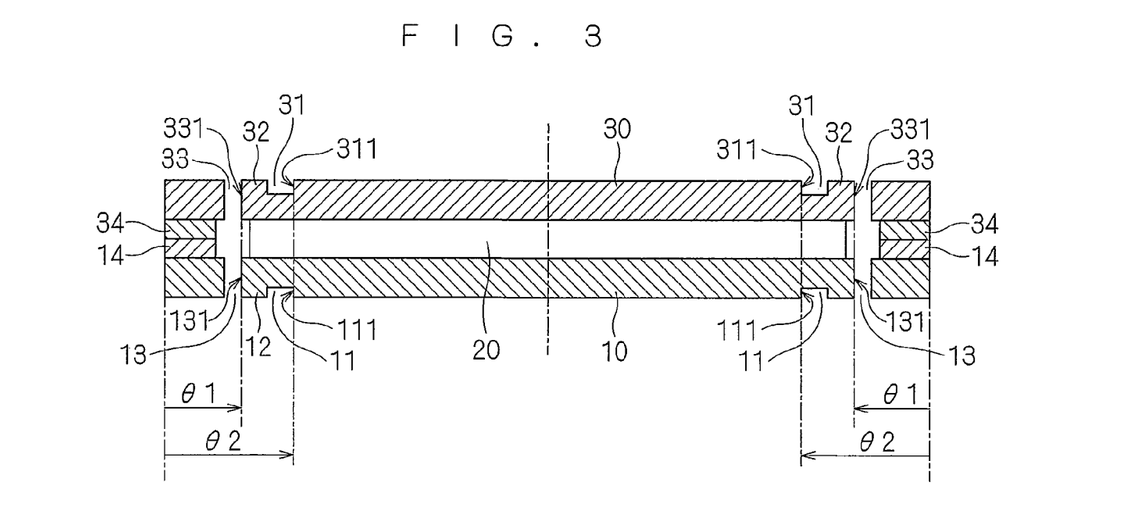
FIG. 3 is a cross-sectional view of the field element shown in FIG. 2 in a circumferential direction.

The magnetic plates 1 and 3 have, for example, a circular flat plate shape with the rotation axis P being as a center. The magnetic plates 1 and 3 and the permanent magnets 20 are shown by being disassembled in FIG. 1, but in actuality, both end surfaces in the rotation axis direction of the permanents magnets 20 are sandwiched by the magnetic plates 1 and 3. More specific shapes of the magnetic plates 1 and 3 are described also with reference to FIGS. 2 and 3. FIG. 2 is a bottom view of a portion corresponding to one of the permanent magnets 20 of the field element shown in FIG. 1. FIG. 3 is a cross-sectional view of the field element shown in FIG. 2 at a position where non-magnetic members 11 and 13 are present in a circumferential direction with the rotation axis P being as the center (hereinafter, referred to as circumferential direction). Note that in FIG. 2, a relative position of one permanent magnet 20 with respect to the magnetic plate 1 is indicated by a dot-dot-dash line.

The magnetic plate 1 includes magnetic members 10, 12, 14 and 15 and the non-magnetic members 11 and 13. The magnetic plate 3 includes magnetic members 30, 32, 34 and 35 and non-magnetic members 31 and 33. The magnetic plate 3 has the same shape as the magnetic plate 1. Specifically, the magnetic members 30, 32, 34 and 35 and the non-magnetic members 31 and 33 have the same shapes as the magnetic members 10, 12, 14 and 15 and the non-magnetic members 11 and 13, respectively. Hereinafter, the magnetic plate 1 will be representatively described, and description of the magnetic plate 3 will be omitted.

The magnetic member 10 is in contact with a magnetic pole surface of one permanent magnet 20 in the rotation axis direction. The non-magnetic member 11 is, for example, an air space. The non-magnetic member 11 is adjacent to the magnetic member 10 in the circumferential direction, and overlaps a part of the one permanent magnet 20 in the rotation axis direction. More specifically, the non-magnetic members 11 are provided at positions corresponding to both ends of one permanent magnet 20 in the circumferential direction. The non-magnetic members 11 extend in a radial direction with the rotation axis being as the center (hereinafter, referred to as radial direction).

In FIG. 3, the non-magnetic member 11 is illustrated as a concave portion which opens toward a side opposite to the permanent magnet 20 in the rotation axis direction, and a part of the magnetic member 10 is arranged between the permanent magnet 20 and the non-magnetic member 11. Not that it is not essential to arrange a part of the magnetic member 10 between the non-magnetic member 11 and the permanent magnet 20, but a working point of the permanent magnet 20 can be raised as a result of the above.

The magnetic member 12 is adjacent to the non-magnetic member 11 on a side opposite to the magnetic member 10 in the circumferential direction. In addition, the magnetic member 12 extends in the radial direction.

The non-magnetic member 13 is for example, an air space, and is adjacent to the magnetic member 12 on a side opposite to the non-magnetic member 11 in the circumferential direction. The non-magnetic member 13 is provided at a position so as not to overlap the permanent magnet 20 in the rotation axis direction, and is illustrated as a through hole in FIG. 3. In addition, the non-magnetic member 13 extends in the radial direction with a substantially uniform width.

The non-magnetic member 13 penetrates the magnetic plate 1 in the rotation axis direction, and thus the leakage flux of the permanent magnet 20 can be reduced. Note that in order to attain this effect, the width of the non-magnetic member 13 in the circumferential direction is desirably large to some extent. The non-magnetic member 13 is generally provided for reducing the leakage flux.

The magnetic member 14 is positioned between the adjacent permanent magnets 20 in the circumferential direction and extends in the rotation axis direction. In FIG. 3, the magnetic member 14 has a projecting shape in which the magnetic member 14 projects in the rotation axis direction by a half of a thickness of the permanent magnet 20 in the rotation axis direction. The magnetic member 14 is continuous with the magnetic member 34 of the magnetic plate 3 in the rotation axis direction.

Note that the magnetic members 14 and 34 are not necessarily required, but a q-axis inductance can be increased by the magnetic members 14 and 34. As a result, reluctance torque can be improved.

The magnetic member 15 couples the magnetic members 10 and 12 to each other on at least one end side of the non-magnetic member 11 in the radial direction, which is opposite to the rotation axis P. In the field element illustrated in FIGS. 1 to 3, the magnetic member 15 couples the magnetic members 10 and 12 to each other on both end sides of the non-magnetic member 11 in the radial direction. Note that the magnetic member 15 is not necessarily required, but strength of the magnetic plate 1 can be improved by the magnetic member 15. In addition, the magnetic member 15 extends in the circumferential direction beyond the non-magnetic member 13 in the radial direction. Accordingly, the strength of the magnetic plate 1 can be improved further. Note that the width of the magnetic member 15 in the radial direction is desirably small. This is because leakage flux, which is generated by passing through the magnetic member 15, can be prevented.

This field element is capable of forming a rotating electric machine together with armatures (not shown) which are disposed on both sides in the rotation axis direction thereof via a predetermined air gap. Note that the field element is held in, for example, a manner using a columnar non-magnetic member shaft with the rotation axis P being as the center, a manner using a non-magnetic member boss, a manner in which the entire field element is held by a non-magnetic member, or a manner in which the entire field element is molded to be held.

In the rotating electric machine with such a configuration, the permanent magnets 20 generate magnetic fluxes on surfaces of the magnetic plates 1 and 3 which are on sides opposite to the permanent magnets 20. The density distribution of the magnetic flux generated on the surface corresponding to one permanent magnet 20 is symmetrical with respect to an axis R which passes through a center of one permanent magnet in the circumferential direction (hereinafter, referred to as pole center) and is parallel to the radial direction. This is because, as shown in FIGS. 2 and 3, a shape of portion corresponding to one permanent magnet 20 of the field element is symmetrical with respect to the axis R.

Further, polarities of the magnetic poles, which are provided in the magnetic plate 1 (or magnetic plate 3) by the permanent magnets 20 adjacent to each other in the circumferential direction, are different from each other. For this reason, as to the density distribution of the magnetic fluxes generated on the surfaces of the magnetic plates 1 and 3, the magnetic flux density becomes zero at a midpoint between the permanent magnets 20 adjacent to each other in the circumferential direction (hereinafter, referred to as pole gap).

That is, this magnetic flux density distribution includes a waveform in which a length between the adjacent pole gaps in the circumferential direction is a half-wavelength, and odd-order harmonic components in which the waveform is a fundamental component. Those harmonic components cause vibrations and noise. In particular, a fifth-order harmonic component and a seventh-order harmonic component have larger amplitude than a harmonic component of eleventh-order or more, and accordingly cause noise more easily.

Here, with reference to FIG. 2, it is assumed that $\theta 1$ is an angle defined by a boundary 131 between the magnetic member 12 and the non-magnetic member 13 in the circumferential direction with respect to a reference axis Q with the rotation axis P being as the center, and that $\theta 2$ is an angle defined by a boundary 111 between the magnetic member 10 and the non-magnetic member 11 in the circumferential direction with respect to the reference axis Q with the rotation axis P being as the center. Note that the reference axis Q is an axis which passes through the pole gap and is parallel to the radial direction. Assuming that the number of pole pairs of the field element is Pn and an odd number equal to or more than three is i, the non-magnetic members 11 and 13 are respectively provided at positions which satisfy:

$$0 < \theta 1 < 180/(i \cdot Pn) \quad (1);$$

and $$180/(i \cdot Pn) \leq \theta 2 \leq 180 \cdot 2/(i \cdot Pn) \quad (2).$$

Note that the number of pole pairs refers to the number of pairs of magnetic poles provided by the permanent magnet 20 about the rotation axis P.

Figure 4:
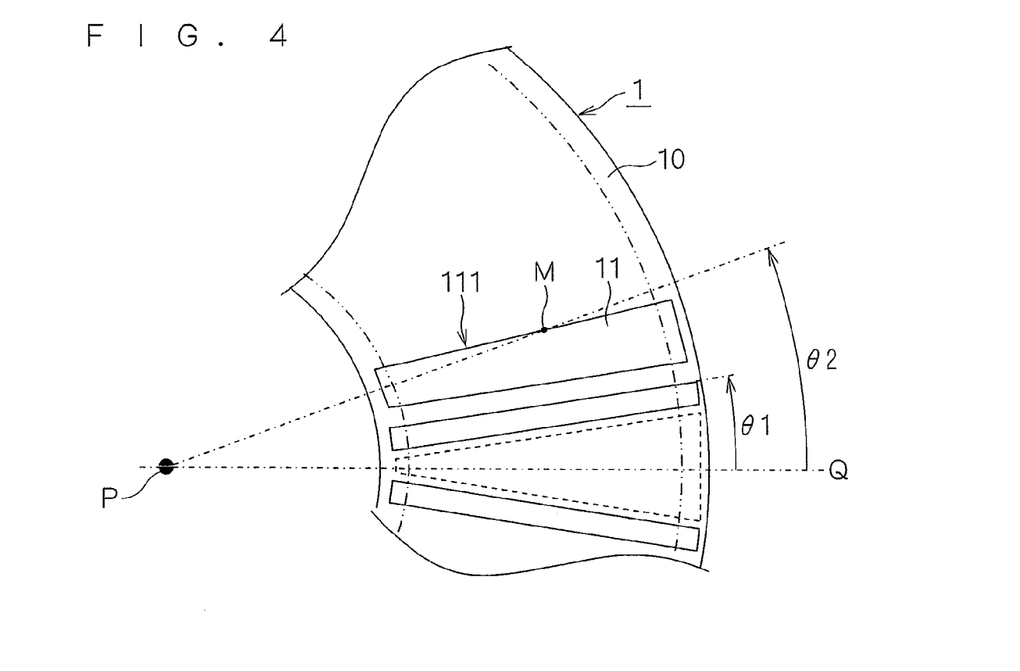
FIG. 4 is a view showing an example of a method of defining an angle foamed by an end portion of a non-magnetic member.

Note that in FIG. 2, the boundaries 111 and 131 are assumed to extend substantially along the radial direction, but not limited thereto. For example, as shown in FIG. 4, in a case where the boundary 111 is inclined to the radial direction, the angle $\theta 2$ can be defined as an average angle in portions opposite to the armature. Specifically, in a case where the armature (in particular, core around which a winding is wound) is located at a position sandwiched by dot-dot-dash lines in FIG. 4, for example, θ2 may be defined as an angled defined by a midpoint M in a portion of the boundary 111, which is opposite to the armature, with respect to the reference axis P with the rotation axis P being as the center.

Figure 5:
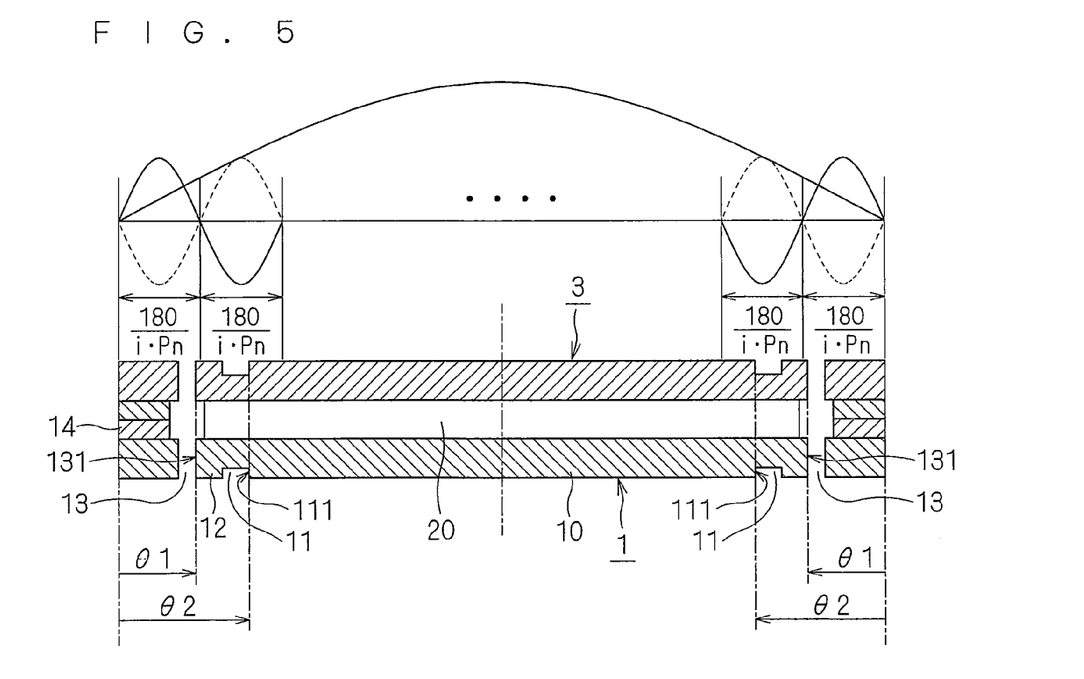
FIG. 5 is a view showing an example of a distribution of a density of a magnetic flux generated on a surface of a magnetic plate.

FIG. 5 shows a cross-section at a position where the non-magnetic members 11 and 13 are present in the magnetic field corresponding to one permanent magnet 20, which also shows an example of densities of the magnetic fluxes generated on the surfaces of the magnetic plates 1 and 3. Referring to FIG. 5, when the non-magnetic member 13 is located at a position which satisfies the relational expression (1), in the density distribution of the magnetic flux generated on the surface of the magnetic plate 1, the magnetic flux density decreases in this range. Accordingly, there is generated i-order harmonic component (zero at the pole gap) in which a valley is in this range. That is, i-order harmonic components are generated due to the non-magnetic member 13 provided for reducing the leakage flux.

Besides, in order to reduce the i-order harmonic components due to the non-magnetic member 13, the non-magnetic member 11 is provided at a position which satisfies the relational expression (2). In the density distribution of the magnetic flux generated on the surface of the magnetic plate 1, the non-magnetic member 11 decreases the magnetic flux density in this range, whereby the i-order harmonic component (zero at the pole gap) in which the valley is in this range is generated.

That is, due to the non-magnetic member 11, there is generated an i-order harmonic component whose phase is deviated by 180° (half-wavelength) for an i-order harmonic component generated due to the non-magnetic member 13. Accordingly, they cancel each other, with the result that the i-order components of the magnetic flux density can be reduced. Note that the magnetic plate 3 has the same shape as the magnetic plate 1, whereby it is possible to, in the similar manner, reduce i-order harmonic components of the density of the magnetic flux generated on the surface of the magnetic plate 3.

Accordingly, it is possible to reduce the i-order harmonic components of induced voltage generated in the armatures disposed on both sides of this field element while reducing the leakage flux by providing the non-magnetic member 13. Therefore, vibrations and noise can be reduced.

Note that it is preferred that the angle θ2=180/(i·Pn). In this case, the angle θ2 takes the smallest value, and thus the magnetic member 10 extends in the circumferential direction, thereby improving the density of the magnetic flux generated on the surface at the center of the magnetic member 10. On this occasion, considering the positions of the magnetic members 12 and 14, the non-magnetic member 13 is preferred to be located at a position which satisfies the angle θ1=90/(i·Pn).

Here, in a case where the armature is formed by concentrated winding, the fifth-order harmonic component and the seventh-order harmonic component are generally large. In this case, for example, in order to reduce the fifth-order harmonic component of the magnetic flux density of the field element, it is required to provide the non-magnetic members 11 and 13 so as to satisfy 0<θ1<18° and 18°≦θ2≦36° by respectively substituting five into i and two into Pn in the relational expressions (1) and (2) assuming that the number of pole pairs is two. More desirably, θ1 is 9° and θ2 is 18°.

Note that the description has been given assuming that the magnetic plate 3 has the same shape as the magnetic plate 1, but is not limited thereto. For example, relative positions of the non-magnetic members 31 and 33 to the magnetic plate 3 can be different from relative positions of the non-magnetic members 11 and 13 to the magnetic plate 1, respectively. Specific description thereof will be given below.

Figure 6:
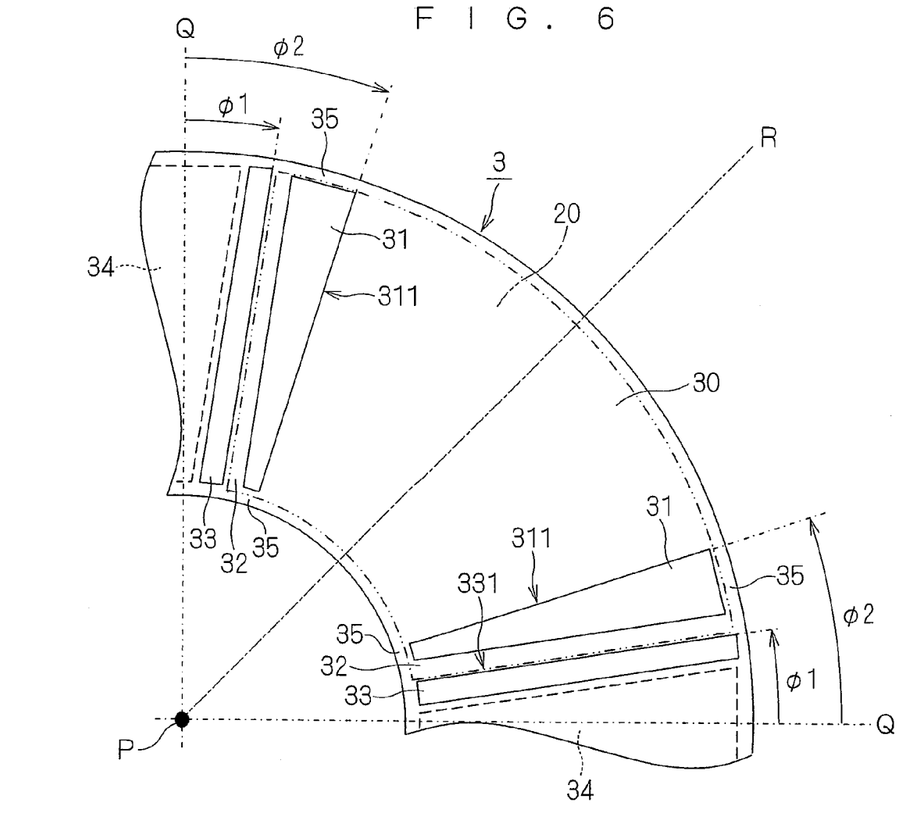
FIG. 6 is a top view showing a portion of the field element according to the first embodiment, which corresponds to one permanent magnet.
Figure 7:
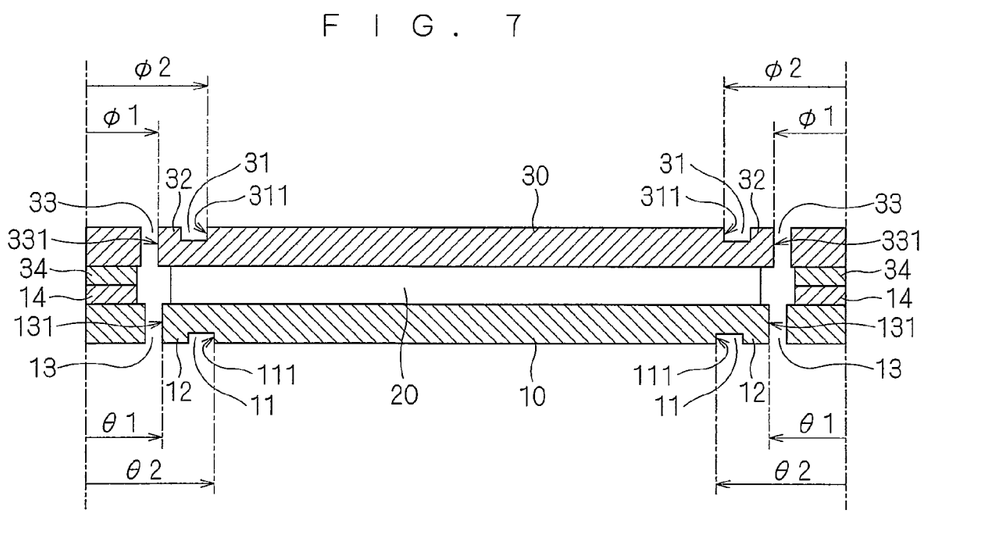
FIG. 7 is a cross-sectional view of the field element shown in FIG. 6 in the circumferential direction.

FIG. 6 shows a portion corresponding to one permanent magnet 20 of the conceptual top view of the field element shown in FIG. 1. FIG. 7 is a cross-sectional view taken at a position where the non-magnetic members 31 and 33 are present in the circumferential direction of the field element shown in FIG. 6. It is assumed that θ1 is an angle defined by a boundary 331 between the magnetic member 32 and the non-magnetic member 33 in the circumferential direction with respect to the reference axis Q with the rotation axis P being as the center, and that θ2 is an angle defined by a boundary 311 between the magnetic member 30 and the non-magnetic member 31 in the circumferential direction with respect to the reference axis Q with the rotation axis P being as the center. When an odd number equal to or more than three is assumed to be K, the non-magnetic members 31 and 33 may be respectively provided at positions which satisfy:

$$0<\theta1<180/(K \cdot Pn) \quad (3); \text{ and}$$

$$180/(K \cdot Pn) \leqq \theta2 \leqq 180.2/(K \cdot Pn) \quad (4).$$

In this case, it is possible to reduce a K-order harmonic component in the density distribution of the magnetic flux generated on the surface of the magnetic member 30 on a side opposite to one permanent magnet 20. That is, it is possible to reduce not only the i-order harmonic component but also the K-order harmonic component of the induced voltage generated in the armatures disposed on the both sides of the field element in the rotation axis direction. Accordingly, vibrations and noise can be reduced further. Note that as in the case of the magnetic plate 1, it is preferred that θ1=90/(K·Pn) and θ2=180/(K·Pn). Alternatively, in a case where the magnetic plates 1 and 3 are formed assuming that i=5 and K=7, an enhanced effect is particularly obtained by the armature using a concentratedly wound armature.

Note that the magnetic plate 3 is not necessarily required to include the non-magnetic member 31. For example, if the i-order harmonic component can be sufficiently reduced by the non-magnetic members 11 and 13 provided in the magnetic plate 1 and hence a harmonic component of other order does not need to be reduced, the non-magnetic member 31 does not need to be provided. The same holds true for the non-magnetic member 33. However, in terms of reducing the leakage flux of the permanent magnet 20, it is preferred that the non-magnetic member 33 be provided so as to pierce through the magnetic plate 3 in the rotation axis direction.

If the shape in the portion corresponding to one permanent magnet 20 is symmetrical with respect to the axis R in any field elements described above, and also if the shapes in the portions corresponding to all permanent magnets 20 are the same, it is possible to prevent the field element from tilting with respect to the rotation axis P. As a result, air gap accuracy between the armature and the field element can be maintained, whereby it is possible to prevent characteristics of the rotating electric machine from deteriorating due to the tilt.

Note that when the non-magnetic members 11, 13, 31 and 33 as described above are formed of an air space, there is a fear that strength thereof may decrease and thus the magnetic plates 1 and 3 may be deformed by a centrifugal force due to rotation. However, according to this field element, deformation in the rotation axis is unlikely to occur, whereby the distance (air gap) between the field element and the armature is unlikely to be affected. Therefore, there is an advantage that the characteristics of the rotating electric machine are unlikely to deteriorate.

Note that the magnetic plates 1 and 3 are desirably formed of a dust core. For example, in a case where the magnetic plates 1 and 3 are formed of a laminated steel sheet or the like, through holes are provided in the laminated steel sheet by punching for providing the non-magnetic members 11 and 13 in the magnetic plate 1. A punching member for forming such through hole is worn away through several tens of thousands of times of punching, and eventually cannot be used. Meanwhile, in this field element, the magnetic plates 1 and 3 can be formed of a dust core, and thus there arises no problem regarding durability of the punching member as described above. Accordingly, productivity can be improved.

Further, in the case where the magnetic plates 1 and 3 are formed of a dust core, the magnetic plates 1 and 3 preferably have a small step in thickness in the rotation axis direction. For example, press forming needs to be repeatedly performed when the step is large, and productivity is decreased in some cases. Thus, a pair of the magnetic members 14 and 34 may be formed separately from the magnetic plates 1 and 3. In such a case, productivity can be improved.

When an axial gap type rotating electric machine is generally assembled, assembly or inspection is performed using a gap gage for obtaining a desired air gap. Specifically, assembly or inspection is performed while the gap gage is inserted between the armature and the field element from the outer periphery side of the magnetic plates 1 and 3. In this case, when the outer peripheries of the magnetic plates 1 and 3 continue by the magnetic members 15 and 35, the gap gage can be inserted from any direction. Accordingly, assembly or inspection can be performed with ease. Note that in terms of characteristics of the rotating electric machine, the magnetic members 15 and 35 are desired not to be opposed to the core of the armature in the rotation axis direction.

Note that the magnetic plates 1 and 3 continue in the circumferential direction in the first embodiment, but any one thereof may be separated from the other thereof for each permanent magnet 20. In this case, it is possible to further reduce the leakage flux on the separated magnetic plate side.

Second Embodiment

Figure 8:
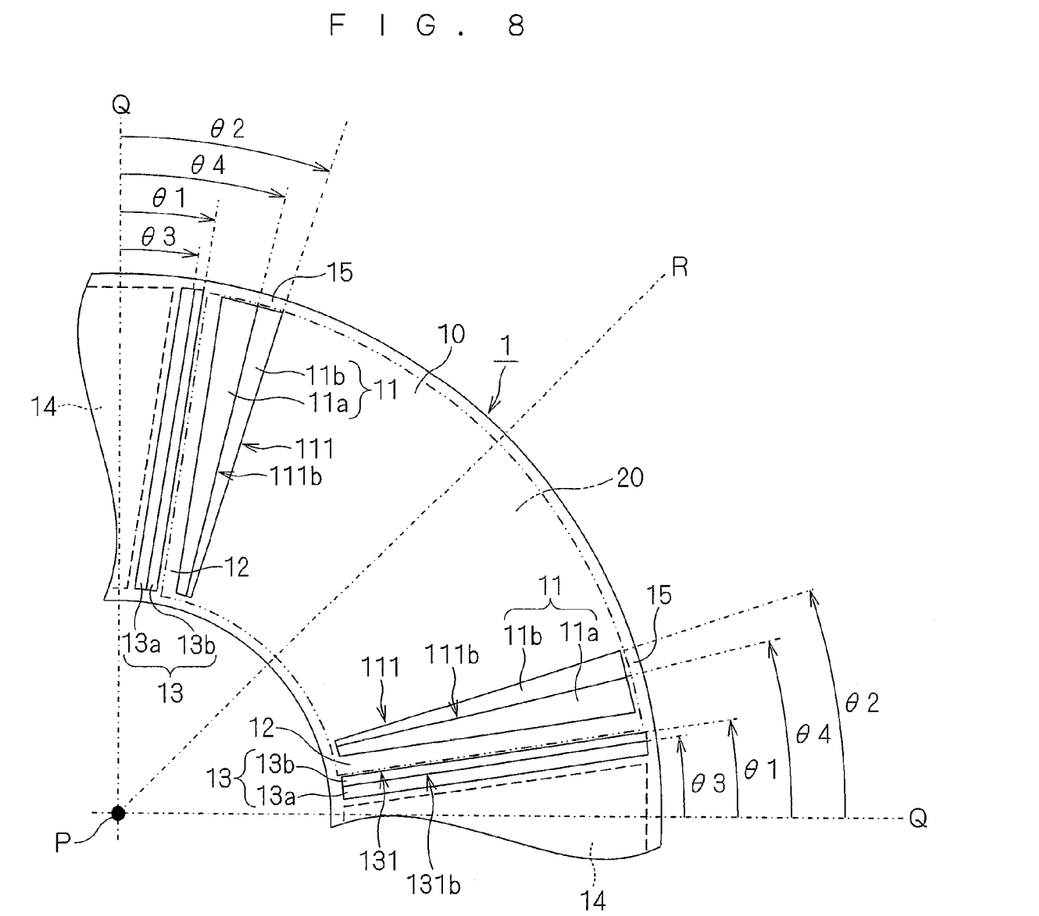
FIG. 8 is a bottom view showing a portion of a field element according to a second embodiment, which corresponds to one permanent magnet.
Figure 9:
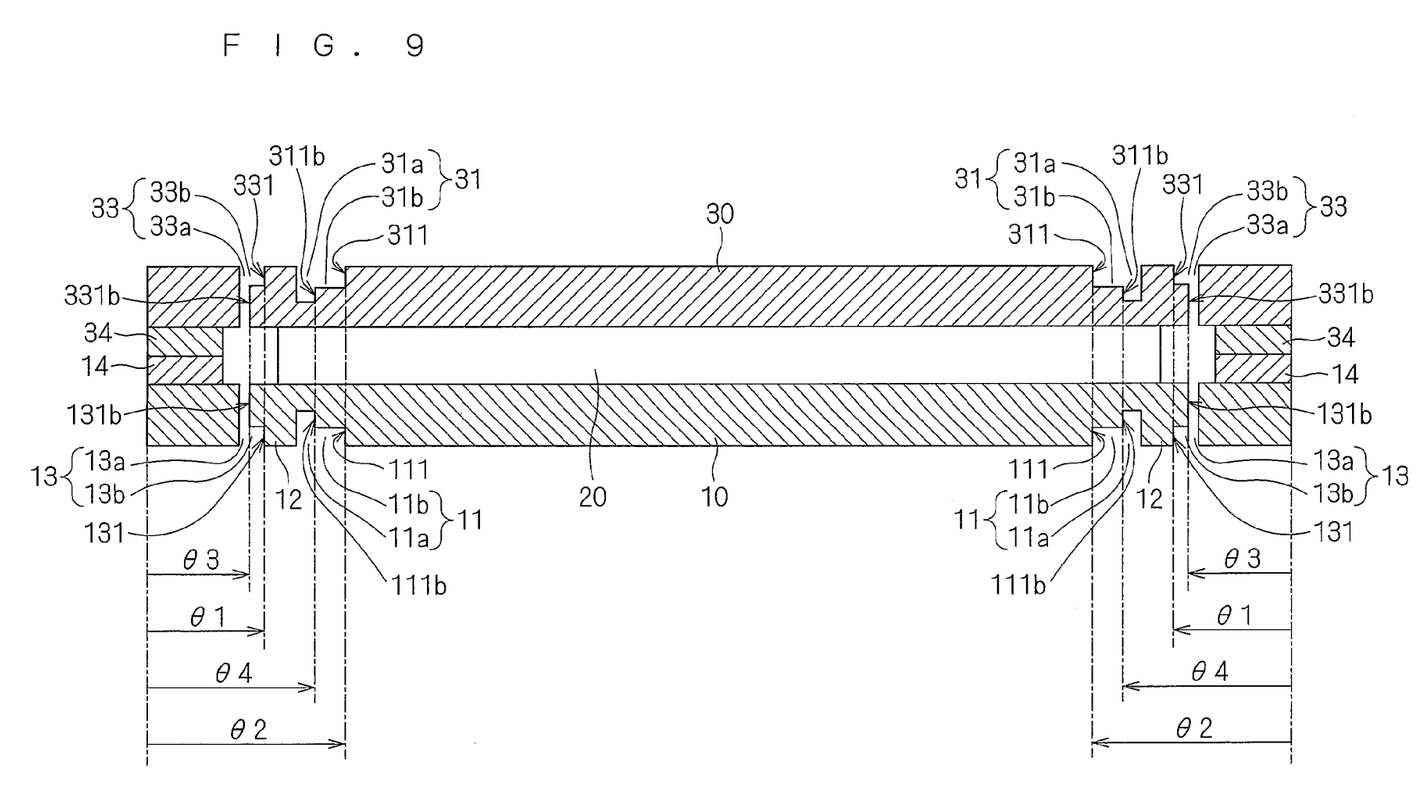
FIG. 9 is a cross-sectional view of the field element shown in FIG. 8 in the circumferential direction.

A field element according to a second embodiment of the present invention will be described by giving description of a difference from the first embodiment. FIG. 8 is a conceptual bottom view of this field element. FIG. 9 is a cross-sectional view taken at a position where the non-magnetic members 11 and 13 are present in the circumferential direction of the field element shown in FIG. 8. FIGS. 8 and 9 each show a portion corresponding to one permanent magnet 20.

The non-magnetic member 11 includes non-magnetic member parts 11a and 11b, and the non-magnetic member 13 includes non-magnetic member parts 13a and 13b. The non-magnetic member 31 includes non-magnetic member parts 31a and 31b, and the non-magnetic member 33 includes non-magnetic member parts 33a and 33b. The following description is first given of a case where the magnetic plates 1 and 3 have the same shape with each other.

The non-magnetic member part 11a is, for example, an air space. The non-magnetic member part 11b is, for example, an air space and is adjacent to the non-magnetic member part 11a on the magnetic member 10 side in the circumferential direction. Moreover, the non-magnetic member parts 11a and 11b are different from each other in length in the rotation axis direction (that is, thickness in the rotation axis direction; hereinafter, referred to as thickness). More specifically, the thickness of the non-magnetic member part 11b is smaller than the thickness of the non-magnetic member part 11a.

The non-magnetic member part 13a is, for example, an air space. The non-magnetic member part 13b is, for example, an air space and is adjacent to the non-magnetic member part 13a on the magnetic member 10 side in the circumferential direction. Moreover, the non-magnetic member parts 13a and 13b are different from each other in thickness. More specifically, the thickness of the non-magnetic member part 13b is smaller than the thickness of the non-magnetic member part 13a. Note that the thickness of the non-magnetic member part 13a is the same as the thickness of the magnetic member 10. In other words, the non-magnetic member part 13a pierces through the magnetic plate 1 in the rotation axis direction.

It is assumed that θ3 is an angle defined by a boundary 131b between the non-magnetic member part 13a and the non-magnetic member part 13b in the circumferential direction with respect to the reference axis Q with the rotation axis P being as the center, and that θ4 is an angle defined by a boundary 111b between the non-magnetic member part 11a and the non-magnetic member part 11b in the circumferential direction with respect to the reference axis Q with the rotation axis P being as the center. Then, when it is assumed that j is an odd number equal to or more than three, which is a value different from i, the non-magnetic member parts 11a, 11b, 13a and 13b are respectively provided at positions which satisfy:

$$0 < \theta_1 < 180/(i \cdot Pn) \quad (1);$$

$$180/(i \cdot Pn) \leq \theta_2 \leq 180 \cdot 2/(i \cdot Pn) \quad (2);$$

$$0 < \theta_3 < 180/(j \cdot Pn) \quad (5);$$

$$180/(j \cdot Pn) \leq \theta_3 \leq 180 \cdot 2/(j \cdot Pn) \quad (6); \text{ and}$$

$$\theta_3 < \theta_1 < \theta_4 < \theta_2 \quad (7).$$

Note that the boundaries 111b and 131b are assumed to extend substantially in the radial direction as in the first embodiment, but are not limited thereto.

Besides, in the same manner described in the first embodiment, j-order harmonic components, which are deviated from each other in phase by 180° (half-wavelength) due to the non-magnetic member parts 11a and 13a, are generated on the surface of the magnetic plate 1. Accordingly, they cancel each other, whereby it is possible to reduce the j-order harmonic components in the density distribution of the magnetic flux generated on the surface of the magnetic plate 1. Therefore, it is possible to reduce not only the i-order harmonic components but also the j-order harmonic components of the induced voltage generated in the armature, and hence vibrations and noise can be reduced further.

In addition, as in the first embodiment, it is desired that θ3=90/(j·Pn) and θ4=180/(j·Pn). In this case, the non-magnetic member part 11b having a small thickness in the rotation axis direction is large in the circumferential direction, with the result that the density of the magnetic flux generated on the surface of the magnetic plate 1 can be improved.

Note that the non-magnetic member 11 (13) includes two non-magnetic member parts 11a and 11b (13a and 13b) which are different from each other in thickness, but is not limited thereto, and may include three non-magnetic member parts different from each other in thickness. In this case, harmonic components of three orders can be reduced. It goes without saying that four or more non-magnetic member parts may be provided.

Note that the magnetic plate 3 is not limited to have the shape same as the magnetic plate 1 as in the first embodiment. Specifically, when it is assumed that θ3 is an angle defined by a boundary 331b between non-magnetic member part 33a and the non-magnetic member part 33b in the circumferential direction with respect to the reference axis Q with the rotation axis P being as the center, that θ4 is an angle defined by a boundary 31lb between non-magnetic member part 31a and the non-magnetic member part 3lb in the circumferential direction with respect to the reference axis Q with the rotation axis P being as the center, and that L is an odd number equal to or more than three, in which L is a value different from K, the non-magnetic member parts 31a, 31b, 33a and 33b may be provided at positions which satisfy:

$$0<\theta 1<180/(K\cdot Pn) \quad (3);$$

$$180/(K\cdot Pn)=\theta 2=180\cdot 2/(K\cdot Pn) \quad (4);$$

$$0<\theta 3<180/(L\cdot Pn) \quad (8);$$

$$180/(L\cdot Pn)=\theta 4=180\cdot 2/(L\cdot Pn) \quad (9); \text{ and}$$

$$\theta 3<\theta 1<\theta 4<\theta 2 \quad (10).$$

In this case, it is possible to reduce the K-order harmonic component and the L-order harmonic component in the density distribution of the magnetic flux generated on the surface of the magnetic plate 3. Accordingly, it is possible to reduce the i-order harmonic component, j-order harmonic component, K-order harmonic component, and L-order harmonic component of the induced voltage generated in the armature, with the result that vibrations and noise can be reduced further. Note that it is preferred that θ3=90/(L·Pn) and θ4=180/(L·Pn). Further, the non-magnetic members 31 and 33 may include three or more non-magnetic member parts different from each other in thickness. Alternatively, when i, j, K or L may be adequately set to five or seven, an effect is particularly enhanced in a case where the fifth-order harmonic component and the seventh-order harmonic component are large (for example, case where the armature is formed by concentrated winding).

Third Embodiment

Figure 10:
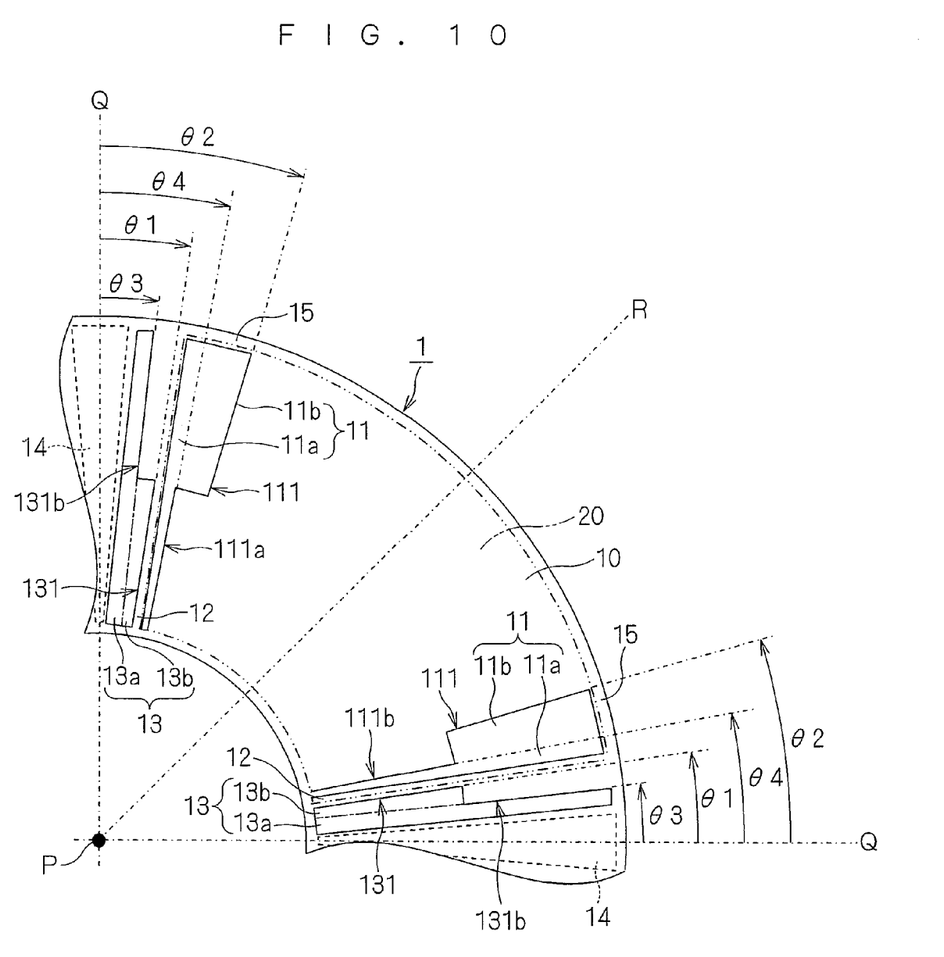
FIG. 10 is a bottom view showing a portion of a field element according to a third embodiment, which corresponds to one permanent magnet.

A field element according to a third embodiment of the present invention will be described by giving description of a difference from the second embodiment. FIG. 10 shows a portion corresponding to one permanent magnet 20 of a bottom view of this field element. Note that the conceptual cross section at the position where the non-magnetic members 11 and 13 are present in the circumferential direction of the field element shown in FIG. 10 is substantially the same as FIG. 3.

The non-magnetic member parts 11a and 11b are different from each other in length in the radial direction (hereinafter, merely referred to as length). Specifically, the non-magnetic member part 11b has the length shorter than the length of the non-magnetic member part 11a. Note that the non-magnetic member parts 11a and 11b have the same thickness.

The non-magnetic member parts 13a and 13b are different from each other in length. Specifically, the non-magnetic member part 13b has the length shorter than the length of the non-magnetic member part 13a. Note that the non-magnetic member parts 13a and 13b have the same thickness as the magnetic member 10. In other words, the non-magnetic member parts 13a and 13b pierce through the magnetic plate 1 in the rotation axis direction.

As in the second embodiment, the magnetic plate 3 has the same shape as the magnetic plate 1, and the non-magnetic member parts 11a, 11b, 13a and 13b are provided at positions which satisfy the relational expressions (1), (2), (5), (6) and (7). Accordingly, it is possible to reduce the i-order harmonic component and the j-order harmonic component of the induced voltage generated in the armature.

Alternatively, in a case where the relative positions of the non-magnetic member parts 31a, 31b, 33a and 33b to the magnetic plate 3 are different from the relative positions of the non-magnetic member parts 11a, 11b, 13a and 13b to the magnetic plate 1, the non-magnetic member parts 31a, 31b, 33a and 33b are provided at positions which satisfy the relational expressions (3), (4), (8), (9) and (10). As a result, it is possible to reduce the i-order harmonic component, j-order harmonic component, K-order harmonic component and L-order harmonic component of the induced voltage generated in the armature.

Note that the non-magnetic members 11, 13, 31 and 33 each may include four or more non-magnetic member parts. Alternatively, considering the respect of the second embodiment, the thicknesses thereof in the rotation axis direction or the lengths thereof in the radial direction may be different from each other.

Fourth Embodiment

Figure 11:
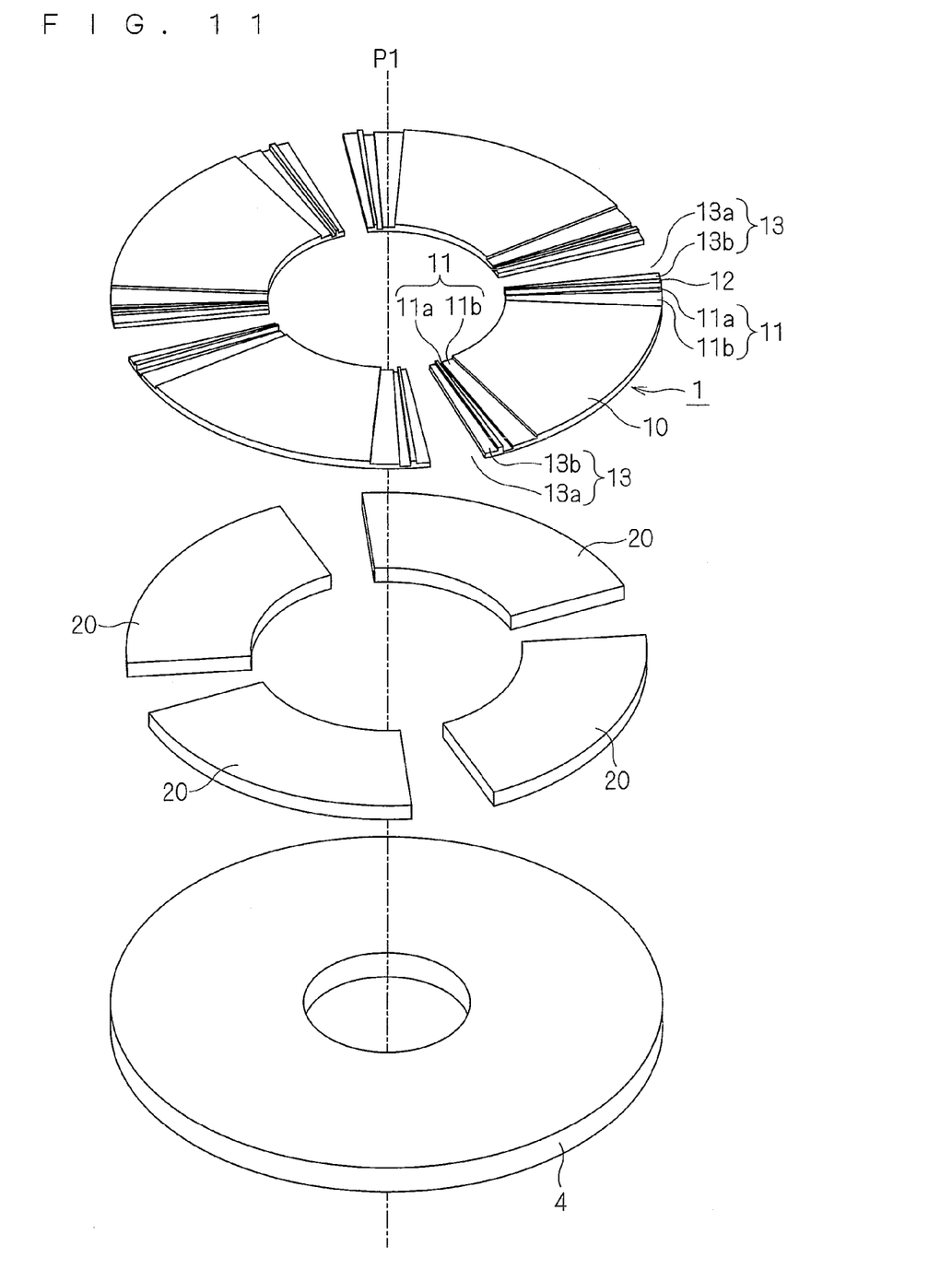
FIG. 11 is a conceptual perspective view showing a field element according to a fourth embodiment, which is separated along the rotation axis.

A fourth embodiment according to the present invention will be described. FIG. 11 is a conceptual perspective view showing a field element of this embodiment, which is disassembled along the rotation axis P.

This field element includes the magnetic plate 1, the permanent magnets 20 and a magnetic plate 4.

The magnetic plate 1 is the magnetic plate 1 which has been described in any of the first to third embodiments. FIG. 11 shows the magnetic plate which does not include the magnetic members 14 and 15 of the magnetic plate 1 described in the second embodiment. That is, the magnetic plate 1 is separated in the circumferential direction for each permanent magnet 20.

The magnetic plate 4 has a flat plate shape having a circular circumference with the rotation axis P being as the center. In addition, the magnetic plate 4 has a thickness sufficient for functioning as a so-called back yoke.

In this field element, the armature is disposed with a predetermined gap on the magnetic plate 1 side in the rotational axis direction, and thus this filed element is capable of forming a rotating electric machine together with the armature. Even in this case, it is possible to reduce the i-order harmonic component and the j-order harmonic component of the induced voltage generated in the armature. In addition, the magnetic plate 1 is separated in the circumferential direction for each permanent magnet 20, whereby it is possible to further reduce the leakage flux of the permanent magnet 20.

While the invention has been shown and described in detail, the foregoing description is in all aspects illustrative and not restrictive. It is therefore understood that numerous modifications and variations can be devised without departing from the scope of the invention.

The invention claimed is:
1. A field element comprising:
a plurality of permanent magnets circularly disposed about a predetermined axis;
a first magnetic member being in contact with a magnetic pole surface of one of said permanent magnets in a first direction parallel to said axis;
a first non-magnetic member which is adjacent to said first magnetic member in a second direction being a circumferential direction with said axis being as a center and overlaps a part of said one of said permanent magnet in said first direction;

a second magnetic member being adjacent to said first non-magnetic member on a side opposite to said first magnetic member in said second direction; and a second non-magnetic member being adjacent to said second magnetic member on a side opposite to said first non-magnetic member in said second direction, wherein when Pn represents the number of pairs of magnetic poles provided by said permanent magnets about said axis and i represents an integer equal to or more than three, a first angle θ1 defined by a boundary between said second magnetic member and said second non-magnetic member in said second direction with respect to a reference axis which passes through a midpoint between another one of said permanent magnets being adjacent to said one of said permanent magnets on said second non-magnetic member side and said one of said permanent magnets and which is parallel to a radial direction with said axis being as the center, and a second angle θ2 defined by a boundary between said first magnetic member and said first non-magnetic member in said second direction with respect to said reference axis with said axis being as the center satisfying:

0<θ1<180/(i·Pn); and (i·Pn)≦θ2≦180·2/(i·Pn).

2. The field element according to claim 1, wherein a part of said first magnetic member is arranged between said one of said permanent magnet and said first non-magnetic member.

3. The field element according to claim 1, further comprising third magnetic members which are positioned between said one of said permanent magnets and said another one of said permanent magnets being adjacent to said one of said permanent magnets and extend in said first direction.

4. The field element according to claim 1, further comprising a fourth magnetic member coupling said first magnetic member and said second magnetic member on at least one end side of said first non-magnetic member which is opposite to said axis in a third direction being a radial direction with said axis being as the center.

5. The field element according to claim 4, wherein said fourth magnetic member extends in said second direction beyond said second non-magnetic member in said third direction.

6. The field element according to claim 1, wherein:
said first angle θ1 satisfies θ1=90/(i·Pn); and
said second angle θ2 satisfies θ2=180/(i·Pn).

7. The field element according to claim 1, wherein i is 5 or 7.

8. The field element according to claim 1, wherein:
said first non-magnetic member includes:
  a first non-magnetic member part; and
  a second non-magnetic member part which is adjacent to said first non-magnetic member part on said first magnetic member side in said second direction and has a length in a direction being parallel to said first direction or said third direction, the length being different from that of said first non-magnetic member part;
said second non-magnetic member includes:
  a third non-magnetic member part; and
  a fourth non-magnetic member part which is adjacent to said third non-magnetic member part on said first magnetic member side in said second direction and has a length in a direction being parallel to said first direction or said third direction, the length being different from that of said first non-magnetic member part; and when j represents an integer equal to or more than three and j is a value different from i, a third angle θ3 defined by a boundary between said third non-magnetic member part and said fourth non-magnetic member part in said second direction with respect to said reference axis with said axis being as the center and a fourth angle θ4 defined by a boundary between said first non-magnetic member part and said second non-magnetic member part in said second direction with respect to said reference axis with said axis being as the center satisfy:

0<θ3<180/(j·Pn);

180/(j·Pn)≦θ4≦180·2/(j·Pn); and

θ3<θ1<θ4<θ2.

9. The field element according to claim 8, wherein:
said third angle θ3 satisfies θ3=90/(j·Pn); and
said fourth angle θ4 satisfies θ4=180/(j·Pn).

10. The field element according to claim 8, wherein j is 5 or 7.

11. The field element according to claim 1, further comprising:
a fifth magnetic member being adjacent to said one of said permanent magnet on a side opposite to said first magnetic member in said first direction;
a third non-magnetic member which is adjacent to said fifth magnetic member in said second direction and overlaps a part of said one of said permanent magnet in said first direction;
a sixth magnetic member being adjacent to said third non-magnetic member on a side opposite to said fifth magnetic member in said second direction; and
a fourth non-magnetic member being adjacent to said sixth magnetic member on a side opposite to said third non-magnetic member in said second direction,
wherein when K represents an integer equal to or more than three, a fifth angle θ1 defined by a boundary between said sixth magnetic member and said fourth non-magnetic member in said second direction with respect to said reference axis with said axis being as the center and a sixth angle θ2 defined by a boundary between said fifth magnetic member and said third non-magnetic member in said second direction with respect to said reference axis with said axis being as the center satisfy:

0<θ1<180/(K·Pn); and (K·Pn)≦θ2≦180·2/(K·Pn).

12. The field element according to claim 11, wherein a part of said fifth magnetic member is arranged between said one of said permanent magnet and said third non-magnetic member.

13. The field element according to claim 11, further comprising a seventh magnetic member coupling said fifth magnetic member and said sixth magnetic member on at least one end side of said third non-magnetic member which is opposite to said axis in said third direction.

14. The field element according to claim 13, wherein said seventh magnetic member extends in said second direction beyond said fourth non-magnetic member in said third direction.

15. The field element according to claim 11, wherein:
said fifth angle θ1 satisfies θ1=90/(K·nPn); and
said sixth angle θ2 satisfies θ2=180/(K·Pn).

16. The field element according to claim 11, wherein K is 5 or 7.

17. The field element according to claim 11, wherein:
said third non-magnetic member includes:
- a fifth non-magnetic member part; and
- a sixth non-magnetic member part which is adjacent to said fifth non-magnetic member part on said fifth magnetic member side in said second direction and has a length in a direction being parallel to said first direction or said third direction: the length being different from that of said fifth non-magnetic member part;

said fourth non-magnetic member includes:
- a seventh non-magnetic member part; and
- an eighth non-magnetic member part which is adjacent to said seventh non-magnetic member part on said fifth magnetic member side in said second direction and has a length in a direction being parallel to said first direction or said third direction: the length being different from that of said seventh non-magnetic member part; and when L represents an integer equal to or more than three and L is a value different from K, a seventh angle $\theta 3$ defined by a boundary between said seventh non-magnetic member part and said eighth non-magnetic member part in said second direction with respect to said reference axis with said axis being as the center and an eighth angle $\theta 4$ defined by a boundary between said fifth non-magnetic member part and said sixth non-magnetic member part in said second direction with respect to said reference axis with said axis being as the center satisfy:

$0 < \theta 3 < 180/(L \cdot Pn)$;

$180/(L \cdot Pn) \leq \theta 4 \leq 180 \cdot 2/(L \cdot Pn)$; and $\theta 3 < \theta 1 < \theta 4 < \theta 2$.

18. The field element according to claim 17, wherein:
said seventh angle $\theta 3$ satisfies $\theta 3 = 90/(L \cdot Pn)$; and
said eighth angle $\theta 4$ satisfies $\theta 4 = 180/(L \cdot Pn)$.

19. The field element according to claim 17, wherein L is 5 or 7.

20. The field element according to claim 1, wherein said first magnetic member and said second magnetic member are formed of a dust core.

* * * * *